United States Patent [19]
Koehn

[11] Patent Number: 6,055,940
[45] Date of Patent: May 2, 2000

[54] ANIMAL SORTING TOOL WITH POKING TIP

[76] Inventor: Jim Koehn, P.O. Box 577, Watertown, S. Dak. 57201-0577

[21] Appl. No.: 09/247,983

[22] Filed: Feb. 11, 1999

[51] Int. Cl.$^7$ .................................................. A01K 15/02
[52] U.S. Cl. ...................... 119/719; 119/712; 119/905; 119/906
[58] Field of Search ..................... 119/719, 712, 119/905, 908, 174, 906; 446/419, 421, 218, 217; D30/156; 473/234; 324/149; 231/7; 84/418; 116/170, 169, 22 A

[56] References Cited

U.S. PATENT DOCUMENTS

| | | |
|---|---|---|
| 52,058 | 1/1866 | Liebold ..................... 116/170 |
| D. 298,822 | 12/1988 | Littledeer . |
| D. 302,147 | 7/1989 | Hartt . |
| D. 386,779 | 11/1997 | Burgos ..................... D17/22 |
| 1,348,836 | 8/1920 | Patremio ................. 116/170 |
| 2,318,460 | 5/1943 | Brief ......................... 446/419 |
| 3,157,000 | 11/1964 | Stavig . |
| 3,575,340 | 4/1971 | Klebold ..................... 231/7 |
| 3,597,861 | 8/1971 | Gordon . |
| 3,648,925 | 3/1972 | Fryer . |
| 3,885,733 | 5/1975 | Klebold et al. ............ 231/7 |
| 3,909,977 | 10/1975 | Kirk . |
| 4,154,018 | 5/1979 | Churchman ............. 446/419 |
| 4,690,404 | 9/1987 | Yoder . |
| 4,957,057 | 9/1990 | Marcucci ................. 116/22 A |
| 5,207,769 | 5/1993 | Malta ......................... 84/418 |
| 5,577,966 | 11/1996 | Duran ....................... 473/234 |

FOREIGN PATENT DOCUMENTS

| | | |
|---|---|---|
| 0 264 294 A2 | 10/1987 | European Pat. Off. . |
| WO 93/20905 A1 | 10/1993 | WIPO . |

*Primary Examiner*—Michael J. Carone
*Assistant Examiner*—Son T. Nguyen
*Attorney, Agent, or Firm*—Kaardal & Associates, PC

[57] ABSTRACT

An animal sorting tool with poking tip for humanely sorting and herding animals. The animal sorting tool with poking tip includes a housing with first and second ends, a pair of lateral sides extending between the ends, and a pair of panels. The ends, lateral sides, and panels of the housing define an interior of the housing. The housing has a tube extending through the ends of the housing. The tube has an open end positioned towards the first end of the housing and a closed tip portion protruding outwardly from the second end of the housing. A handle is inserted in the tube through the open end and extends into the tip portion of the tube.

17 Claims, 2 Drawing Sheets

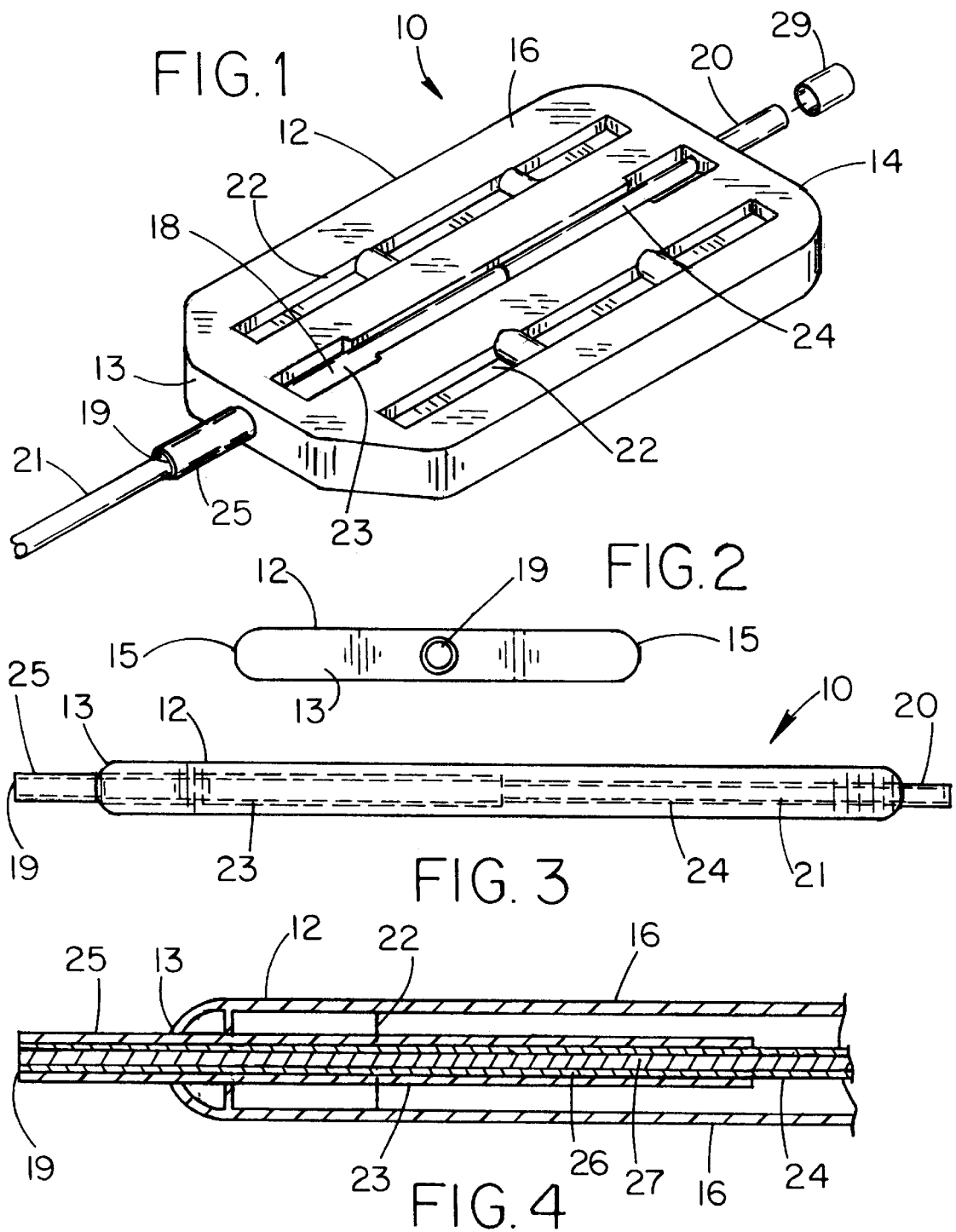

ANIMAL SORTING TOOL WITH POKING TIP

BACKGROUND OF THE INVENTION

1. Field of the Invention

The present invention relates to livestock tools and more particularly pertains to a new animal sorting tool with poking tip for humanely sorting animals.

2. Description of the Prior Art

The use of livestock tools is known in the prior art. More specifically, livestock tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,107,793; U.S. Pat. No. 3,909,977; U.S. Pat. No. 3,648,925; U.S. Pat. No. 3,157,000; U.S. Pat. No. 4,690,404; U.S. Pat. No. 3,597,861; U.S. Pat. No. Des. 298,822; U.S. Pat. No. Des. 302,147; EPO Patent No. 0 264 294 A2 (Inventor: McElhaney, et. al.); and PCT Patent No. WO 93/20905 (Inventor: Rovnyak). Particularly relevant are the livestock tools having a baffled rattle box with noisemaking objects inside and an elongate handle extending from the rattle box and which may or may not extend into the rattle box.

While these devices fulfill their respective, particular objectives and requirements, the aforementioned patents do not disclose a new animal sorting tool with poking tip. Furthermore, these devices have many disadvantages. An inherent problem with animal sorting devices is breakage caused by striking the ground and animals, particularly disadvantageous for the devices that rattle in that the noise-making devices escape from the rattle box, rendering the device silent and thus much less effective. The poking tip of the present invention strikes the ground first, preventing the housing from breaking.

Another problem with these devices is that they are very awkward when used to push a gate open or closed, primarily due to the rounded ends of many of the rattle boxes. The rounded ends tend to slip off of the beam or rod of the gate before it is finally pushed shut, wasting valuable time and perhaps permitting an animal to escape. The poker tip of the present invention creates a corner with the end of the housing which holds a beam or rod of the gate to push the gate closed.

The inventive device overcomes these disadvantages by comprising a housing with first and second ends, a pair of lateral sides extending between the ends, and a pair of panels. The ends, lateral sides, and panels of the housing define an interior of the housing. The housing has a tube extending through the ends of the housing. The tube has an open end positioned towards the first end of the housing and a closed tip portion protruding outwardly from the second end of the housing. A handle is inserted in the tube through the open end and extends into the tip portion of the tube.

In these respects, the animal sorting tool with poking tip according to the present invention substantially departs from the conventional concepts and designs of the prior art, and in so doing provides an apparatus primarily developed for the purpose of humanely sorting animals.

SUMMARY OF THE INVENTION

In view of the foregoing disadvantages inherent in the known types of livestock tools now present in the prior art, the present invention provides a new animal sorting tool with poking tip construction wherein the same can be utilized for humanely sorting animals.

The general purpose of the present invention, which will be described subsequently in greater detail, is to provide a new animal sorting tool with poking tip apparatus and method which has many of the advantages of the livestock tools mentioned heretofore and many novel features that result in a new animal sorting tool with poking tip which is not anticipated, rendered obvious, suggested, or even implied by any of the prior art livestock tools, either alone or in any combination thereof.

To attain this, the present invention generally comprises a housing with first and second ends, a pair of lateral sides extending between the ends, and a pair of panels. The ends, lateral sides, and panels of the housing define an interior of the housing. The housing has a tube extending through the ends of the housing. The tube has an open end positioned towards the first end of the housing and a closed tip portion protruding outwardly from the second end of the housing. A handle is inserted in the tube through the open end and extends into the tip portion of the tube.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new animal sorting tool with poking tip apparatus and method which has many of the advantages of the livestock tools mentioned heretofore and many novel features that result in a new animal sorting tool with poking tip which is not anticipated, rendered obvious, suggested, or even implied by any of the prior art livestock tools, either alone or in any combination thereof.

It is another object of the present invention to provide a new animal sorting tool with poking tip which may be easily and efficiently manufactured and marketed.

It is a further object of the present invention to provide a new animal sorting tool with poking tip which is of a durable and reliable construction.

An even further object of the present invention is to provide a new animal sorting tool with poking tip which is susceptible of a low cost of manufacture with regard to both materials and labor, and which accordingly is then susceptible of low prices of sale to the consuming public, thereby making such animal sorting tool with poking tip economically available to the buying public.

Still yet another object of the present invention is to provide a new animal sorting tool with poking tip which provides in the apparatuses and methods of the prior art some of the advantages thereof, while simultaneously overcoming some of the disadvantages normally associated therewith.

Still another object of the present invention is to provide a new animal sorting tool with poking tip for humanely sorting animals.

Yet another object of the present invention is to provide a new animal sorting tool with poking tip which includes a housing with first and second ends, a pair of lateral sides extending between the ends, and a pair of panels. The ends, lateral sides, and panels of the housing define an interior of the housing. The housing has a tube extending through the ends of the housing. The tube has an open end positioned towards the first end of the housing and a closed tip portion protruding outwardly from the second end of the housing. A handle is inserted in the tube through the open end and extends into the tip portion of the tube.

Still yet another object of the present invention is to provide a new animal sorting tool with poking tip that uses noise and movement to herd animals rather than inhumane shocking devices or striking sticks and belts.

Even still another object of the present invention is to provide a new animal sorting tool with poking tip that is blunt so that the tip may be used to poke animals without bruising the animal.

Even still yet another object of the present invention is to provide a new animal sorting tool with poking tip that may find application in training dogs without physical contact with the dogs. Visual and auditory signals emitted by the tool could be used to teach a dog discipline and train the dog to perform various tasks or tricks.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new animal sorting tool with poking tip according to the present invention.

FIG. 2 is a schematic side view of the present invention.

FIG. 3 is a schematic side view of the present invention.

FIG. 4 is a schematic partial cross sectional view of the present invention.

DESCRIPTION OF THE PREFERRED EMBODIMENT

Figure 5:
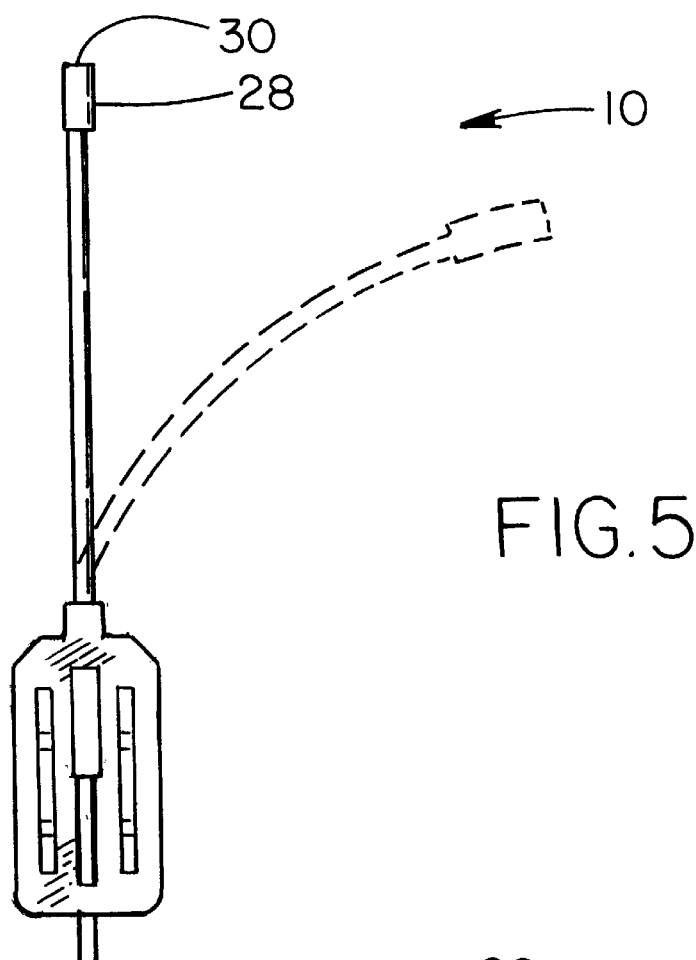
FIG. 5 is a schematic side view of the present invention.

With reference now to the drawings, and in particular to FIGS. 1 through 6 thereof, a new animal sorting tool with poking tip embodying the principles and concepts of the present invention and generally designated by the reference numeral 10 will be described.

As best illustrated in FIGS. 1 through 6, the animal sorting tool with poking tip 10 generally comprises a housing 12 with first and second ends 13,14, a pair of lateral sides 15 extending between the ends, and a pair of panels 16. The ends, lateral sides, and panels of the housing define an interior of the housing. The housing has a tube 18 extending through the ends of the housing. The tube has an open end 19 positioned towards the first end of the housing and a tip portion 20 protruding outwardly from the second end of the housing. A handle 21 is inserted in the tube through the open end and extends into the tip portion of the tube.

Figure 6:
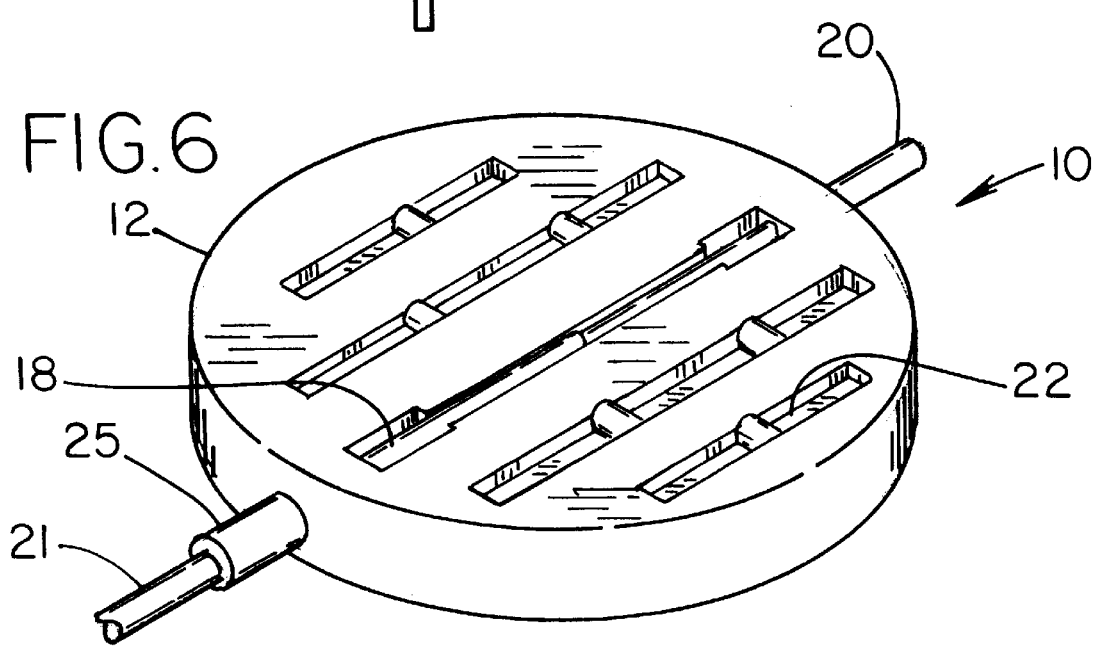
FIG. 6 is a schematic perspective view of the present invention illustrating a variation in the shape of the housing.

In one embodiment, shown in FIGS. 1 through 5, the housing is generally rectangular housing. The housing may take other shapes as well, as shown in FIG. 6. Preferably, the tip portion is generally cylindrical and is closed. Also preferably, the handle is elongate.

Preferably, the housing has a plurality of noisemaking objects (not shown) such as BB's disposed in its interior. The noisemaking objects strike the interior of the housing when the tool is shaken, making a rattling sound which can be used to startle animals to sort or herd them. Ideally, the tube separates the interior of the housing into two sections closed off from each other. If a hole is created in the housing and the noisemaking objects fall out of one section of the housing, noisemaking objects in the other section will continue to make noise. In any case, the tip portion should help prevent breakage of the housing by striking the ground first when the device is struck against the ground, thereby preventing the housing from striking the ground. Because the handle extends into the tip portion, the tip is less likely to break.

Also preferably, the housing has a plurality of baffles 22 extending inwardly from the panels thereof. The baffles provide strength to the housing and for providing additional surface area against which the noisemaking objects can strike.

Preferably, the tube has a first portion 23 positioned towards the open end of the tube and a second portion 24 positioned towards the tip portion of the tube. An outer diameter of the first portion of the tube is greater than an outer diameter of the second portion of the tube. This allows the tip portion of the tube to be smaller and thus more effective as a poker while the first portion maintains high housing strength near the point of entry of the handle.

Ideally, the open end of the tube includes a generally cylindrical sleeve 25 outwardly extending from the first end of the housing. This configuration strengthens the housing even more by spreading the stresses exerted on the tube and housing by the handle along a greater length of the tube, ever more so if the sleeve is resiliently deformable.

Preferably, the handle is resiliently deformable such that opposite ends of the handle can be oriented at at least a 45 degree angle from each other without breaking. Ideally, the ends of the handle can be oriented at up to about a 180 degree angle from each other without breaking (though slight structural damage could occur to the handle with repeated bending, such as internal splintering, but the handle should not snap or break even after extended use). The preferred material for the handle is fiberglass, as it gives the desired strength with the desired flexibility.

Also preferably, the handle has a flexible outer coating 26 extending from a free end 30 of the handle towards an opposite end of the handle. The preferred material for the outer coating is vinyl. The outer coating prevents the fiberglass core 27 from splintering, possibly causing injury to a user and the animals is herded.

Optionally, the handle may have a frictional sheath 28 extending around its free end. The frictional sheath is adapted for frictionally engaging a hand of a user.

Preferably, an inner diameter of the first portion of the tube is greater than an inner diameter of the second portion of the tube. The outer covering of the handle extends along the first portion of the tube. This reduces the weight of that end of the tool, making it easier to manipulate.

A length of the housing is defined between its ends. Preferably, the first portion of the tube extends at least ¼ of the length of the housing through the housing from the first end of the housing.

The outer coating of the handle should extend at least ¼ of the distance (of the housing between its ends) into the housing from the first end of the housing. That is because the outer coating makes the handle more rigid, thus reducing the wear and stresses on the first end of the housing. Rather than bending more at the open end of the tube and wearing it out or breaking it off of the housing, the handle gradually bends, distributing the stress along the tube.

Optionally, as shown in FIG. 1, a rubber sheath 29 covers the tip portion of the tube for lengthening the life of the tip portion and cushioning the impact between the tip portion and the ground.

Exemplary lengths of the tool from the poking tip to the free end of the handle are about 42 inches and 48 inches. Exemplary dimensions for the housing shown in FIG. 1 are 12 inches long by 6 inches wide between the lateral sides by 1 inch deep between the panels.

In use, the free end of the handle is grasped and the housing is shaken to make noise and waved to startle animals to herd them in a desired direction. The tip portion may also be used to poke the animals. The wide housing can be used to strike the animals as well without bruising them.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sorting tool for manipulating actions of animals, comprising:

a housing having first and second ends, a pair of lateral sides extending between said ends, and a pair of panels;

said ends, lateral sides, and panels of said housing defining an interior of said housing;

said housing having a tube with tube portions, each of said tube portions extending through one of said ends of said housing;

a first one of said tube portions having an open end positioned towards said first end of said housing;

a second one of said tube portions forming a tip portion protruding outwardly from said second end of said housing for poking an animal; and a handle being inserted in said tube and extending through the interior of said housing into said tip portion of said tube;

wherein said tip portion has a width and a length extending between said second end of said housing and said tip portion, said tip portion having a substantially uniform width along substantially the entire length of said tip portion.

2. The sorting tool of claim 1, wherein said housing has a plurality of noisemaking objects disposed in said interior.

3. The sorting tool of claim 1, wherein said housing has a plurality of baffles extending inwardly from said panels thereof, said baffles being for providing strength to the panels of said housing.

4. The sorting tool of claim 1, wherein an outer diameter of said first tube portion is greater than an outer diameter of said second tube portion.

5. The sorting tool of claim 4, wherein said handle has a flexible outer coating extending from a free end thereof towards an opposite end of said handle for restricting splintering of said handle, an inner diameter of said first portion of said tube being greater than an inner diameter of said second portion of said tube, said outer coating of said handle extending along said first portion of said tube.

6. The sorting tool of claim 4, wherein a length of said housing is defined between said ends thereof, wherein said first portion of said tube extends at least ¼ of the length of said housing through said housing from said first end of said housing.

7. The sorting tool of claim 1, wherein said open end of said tube includes a generally cylindrical sleeve outwardly extending from said first end of said housing.

8. The sorting tool of claim 1, wherein said handle is resiliently deformable such that opposite ends of said handle can be oriented at at least a 45 degree angle from each other without breaking.

9. The sorting tool of claim 1, wherein said handle has a flexible outer coating extending from a free end thereof towards an opposite end of said handle for restricting splintering of said handle.

10. The sorting tool of claim 1, further comprising a sheath for covering said tip portion of said tube.

11. The sorting tool of claim 1, wherein said housing has a thickness approximately one sixth of the width of said housing to form a paddle shape.

12. The sorting tool of claim 1, wherein said housing has a length defined between said first and second ends, said handle having a protruding portion with a length between the first end of the housing and a free end of said handle, the length of the protruding portion of said handle being approximately twice the length of said housing for permitting a user to contact an animal with said tip portion at a distance from a user holding said handle.

13. The sorting tool of claim 1, wherein said tip portion has a substantially cylindrical shape with a diameter approximately the same as a diameter of the handle for facilitating poking of an animal brought into contact with an end of said tip portion.

14. The sorting tool of claim 1, wherein the ends and sides of said housing form an elongated rectangular perimeter.

15. The sorting tool of claim 1, wherein said housing has a plurality of noisemaking objects disposed in said interior, and wherein said housing has a plurality of baffles extending inwardly from said panels toward the baffles of the other of said panels for providing additional obstacles in said interior to obstruct movement of said objects in said interior and enhance noisemaking.

16. The sorting tool of claim 1, wherein said tip portion has a substantially cylindrical shape with a substantially uniform diameter along a length of the tip portion for facilitating poking of an animal brought into contact with an end of said tip portion.

17. A sorting tool for manipulating actions of animals, comprising:

a housing having first and second ends, a pair of lateral sides extending between said ends, and a pair of panels;

said ends, lateral sides, and panels of said housing defining an interior of said housing;

said housing having a tube with tube portions each extending through one of said ends of said housing;

a first one of said tube portions having an open end positioned towards said first end of said housing and a second one of said tube portions forming a closed tip portion protruding outwardly from said second end of said housing for poking an animal;

a handle being inserted in said tube and extending through the interior of said housing into said tip portion of said tube;

said housing having a plurality of noisemaking objects disposed in said interior of said housing and permitting substantially free movement of said objects in said interior such that said objects strike interior surfaces of said housing to produce noise;

said housing having a plurality of baffles extending inwardly from said panels thereof, said baffles being for providing strength to the panels of said housing;

an outer diameter of said first tube portion being greater than an outer diameter of said second tube portion;

wherein said open end of said tube includes a generally cylindrical sleeve outwardly extending from said first end of said housing;

said handle being resiliently deformable such that opposite ends of said handle can be oriented at at least a 45 degree angle from each other without breaking;

said handle having a flexible outer coating extending from a free end thereof towards an opposite end of said handle for restricting splintering of said handle;

said handle having a frictional sheath extending around said free end thereof, said frictional sheath being adapted for frictionally engaging a hand of a user;

an inner diameter of said first portion of said tube being greater than an inner diameter of said second portion of said tube, said outer coating of said handle extending along said first portion of said tube;

a length of said housing being defined between said ends thereof, wherein said first portion of said tube extends at least ¼ of the length of said housing through said housing from said first end of said housing; and a sheath for covering said tip portion of said tube;

wherein said housing has a thickness approximately one sixth of the width of said housing to form a paddle shape;

wherein said housing has a length defined between said first and second ends, said handle having a protruding portion with a length between the first end of the housing and a free end of said handle, the length of the protruding portion of said handle being approximately twice the length of said housing for permitting a user to contact an animal with said tip portion at a distance from a user holding said handle;

wherein said tip portion has a substantially cylindrical shape with a diameter approximately the same as a diameter of the handle for facilitating poking of an animal brought into contact with an end of said tip portion;

wherein the ends and sides of said housing form an elongated rectangular perimeter; and wherein said housing has a plurality of noisemaking objects disposed in said interior, and wherein said housing has a plurality of baffles extending inwardly from said panels toward the baffles of the other of said panels for providing additional obstacles in said interior to obstruct movement of said objects in said interior and enhance noisemaking.

* * * * *